(12) United States Patent
Wen et al.

(10) Patent No.: US 8,693,325 B2
(45) Date of Patent: Apr. 8, 2014

(54) RADIO COMMUNICATION SYSTEM, RADIO COMMUNICATION METHOD, GATEWAY APPARATUS, AND RADIO STATION

(75) Inventors: Yun Wen, Kawasaki (JP); Hiroshi Fujita, Kawasaki (JP); Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 13/033,981

(22) Filed: Feb. 24, 2011

(65) Prior Publication Data

US 2011/0216649 A1 Sep. 8, 2011

(30) Foreign Application Priority Data

Mar. 5, 2010 (JP) .................................. 2010-49257

(51) Int. Cl.
H04L 12/28 (2006.01)
(52) U.S. Cl.
USPC .......................................... 370/230; 370/329
(58) Field of Classification Search
USPC ................................................ 370/329–347
See application file for complete search history.

(56) References Cited

U.S. PATENT DOCUMENTS

| | | | |
|---|---|---|---|
| 5,740,167 A | 4/1998 | Taketsugu et al. | |
| 6,226,279 B1 * | 5/2001 | Hansson et al. | 370/329 |
| 7,385,952 B2 | 6/2008 | Mantha et al. | |
| 2003/0164752 A1 | 9/2003 | Haimovitch et al. | |
| 2005/0157678 A1 * | 7/2005 | Mantha et al. | 370/329 |

FOREIGN PATENT DOCUMENTS

| | | |
|---|---|---|
| JP | 8-274788 | 10/1996 |
| JP | 2005-513933 | 5/2005 |
| JP | 2009-219007 | 9/2009 |

OTHER PUBLICATIONS

European Search Report pursuant to Rule 62 EPC, dated Jun. 21, 2011, from corresponding European Application No. 11 15 6709.
Notification of Reason for Refusal dated Apr. 30, 2013, from corresponding Japanese Application No. 2010-049257.

* cited by examiner

*Primary Examiner* — Wanda Z Russell
(74) *Attorney, Agent, or Firm* — Katten Muchin Rosenman LLP

(57) ABSTRACT

A radio communication system includes a gateway apparatus and a plurality of radio stations performing radio communication. The gateway apparatus includes, a generation unit that generates allocation information on one or more individual channels each allocated individually to one of a plurality of radio stations; and a transmission unit that transmits the generated allocation information, and the plurality of radio stations each of which comprising, a receiving unit that receives the allocation information; and a data transmission unit that performs data transmission through the one or more individual channels when information indicating an own station is included in the received allocation information, and performs data transmission by random access through a channel other than the one or more individual channels in a radio frame when information indicating the own station is not included in the received allocation information.

15 Claims, 10 Drawing Sheets

FIG. 3

| SLOT1 TIME WIDTH | ALLOCATED RADIO-STATION ID | TRANSMISSION-DESTINATION RADIO STATION ID | SLOT2 TIME WIDTH | ALLOCATED RADIO-STATION ID | TRANSMISSION-DESTINATION RADIO STATION ID | ... | RANDOM-SLOT TIME WIDTH |

FIG. 6A

| SLOT1 TIME WIDTH | 52 | GW | SLOT2 TIME WIDTH | 56 | NONE | RANDOM-SLOT TIME WIDTH |
|---|---|---|---|---|---|---|

FIG. 6B

| SLOT1 TIME WIDTH | 52 | GW | SLOT2 TIME WIDTH | 56 | 52 | RANDOM-SLOT TIME WIDTH |
|---|---|---|---|---|---|---|

FIG. 9

| SLOT1 TIME WIDTH | ALLOCATED RADIO-STATION ID | SLOT2 TIME WIDTH | ALLOCATED RADIO-STATION ID | ... | RANDOM-SLOT TIME WIDTH | ALLOCATED RADIO-STATION-ID LIST HAVING THE OWN STATION AS TRANSMISSION DESTINATION |

FIG. 10A

| SLOT1 TIME WIDTH | 52 | SLOT2 TIME WIDTH | 56 | RANDOM-SLOT TIME WIDTH | 52 |

FIG. 10B

| SLOT1 TIME WIDTH | 52 | SLOT2 TIME WIDTH | 56 | RANDOM-SLOT TIME WIDTH | 56 |

RADIO COMMUNICATION SYSTEM, RADIO COMMUNICATION METHOD, GATEWAY APPARATUS, AND RADIO STATION

CROSS-REFERENCE TO RELATED APPLICATIONS

This application is based upon and claims the benefit of priority from the prior Japanese Patent Application No. 2010-49257 filed on Mar. 5, 2010, the entire contents of which are incorporated herein by reference.

FIELD

The present invention relates to a radio communication system, a radio communication method, a gateway apparatus, and a radio station.

BACKGROUND

To date, in a radio communication system in which a gateway apparatus and a plurality of radio stations perform radio communication, the plurality of radio stations have been configured to transmit packets to the gateway apparatus. When the plurality of radio stations and the gateway apparatus directly perform communication, an access method of a radio station is selected based on an error rate of received packets in the gateway apparatus as one mode. Specifically, the gateway apparatus causes the radio station to select a polling access method in the case of high error rate, and to select a random access method in the case of low error rate (for example, Japanese Laid-open Patent Publication No. 8-274788).

On the other hand, when communication is multi-stage relayed by a plurality of radio stations, as one mode, a random access method is used in which a radio station observes a channel empty state by carrier sense, etc., and communication is performed when electric power of a predetermined threshold value or higher is not detected. Specifically, it is difficult for a plurality of radio stations to be synchronized with all the other radio stations included in a radio communication system, and to grasp interference between the radio stations, and thus a random access method is used.

However, in a related-art technique, there is a problem in that the amount of transmission data by a radio station having a plurality of subordinate radio stations becomes large, and thus congestion might occur. Specifically, in a technique in which communication is multi-stage relayed by a plurality of radio stations, a random access method is used. Thus, collisions may become more frequent at a destination of a radio station having a large amount of transmission data. Thereby, resource consumption may increase in a radio band by retransmission of the transmission data, resulting in the occurrence of congestion. It becomes highly possible that such congestion occurs particularly in the vicinity of a gateway apparatus on which data transmitted from radio stations is concentrated.

SUMMARY

According to an aspect of the invention, a radio communication system includes a gateway apparatus and a plurality of radio stations performing radio communication. The gateway apparatus includes, a generation unit that generates allocation information on one or more individual channels each allocated individually to one of a plurality of radio stations; and a transmission unit that transmits the generated allocation information, and the plurality of radio stations each of which comprising, a receiving unit that receives the allocation information; and a data transmission unit that performs data transmission through the one or more individual channels when information indicating an own station is included in the received allocation information, and performs data transmission by random access through a channel other than the one or more individual channels in a radio frame when information indicating the own station is not included in the received allocation information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates an example of a format of allocation information according to the second embodiment.

FIG. 6A illustrates an example of a format when allocation information is transmitted by a GW according to the second embodiment.

FIG. 6B illustrates an example of a format when allocation information is relayed by a radio station according to the second embodiment.

FIG. 9 illustrates an example of a format of allocation information according to a third embodiment.

FIG. 10A illustrates an example of a format when allocation information is transmitted by a GW according to the third embodiment.

FIG. 10B illustrates an example of a format when allocation information is relayed by a radio station according to the third embodiment.

DESCRIPTION OF EMBODIMENTS

In the following, descriptions will be given of embodiments of a radio communication system, a radio communication method, a gateway apparatus, and a radio station that are disclosed in this application with reference to the accompanying drawings. In this regard, the present invention is not limited by the following embodiments. Also, it is possible to suitably combine each of the embodiments.

First Embodiment

Figure 1:
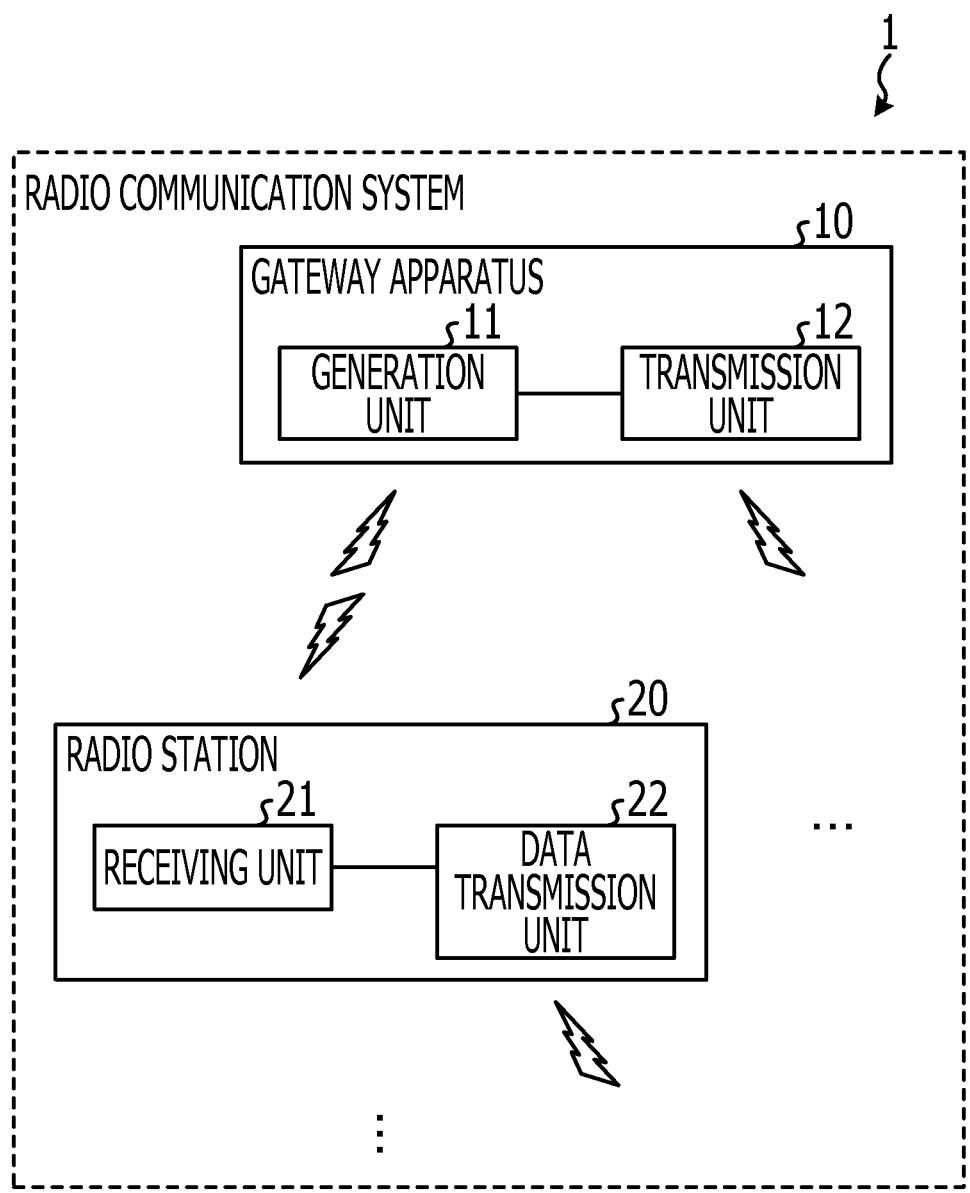
FIG. 1 illustrates an example of a configuration of a radio communication system according to a first embodiment.

A description will be given of an example of a configuration of a radio communication system according to a first embodiment using FIG. 1. FIG. 1 is a diagram illustrating an example of a configuration of a radio communication system according to the first embodiment. As illustrated in FIG. 1, in the radio communication system 1, a gateway apparatus and a plurality of radio stations perform radio communication.

For example, the radio communication system 1 has a gateway apparatus 10 and a radio station 20. In this regard, in radio communication with the gateway apparatus 10, each of the radio stations included in the radio communication system 1 is capable of performing communication by multi-step relay in which the radio communication is performed with the gateway apparatus 10 through a radio station other than an own station.

In the above-described configuration, the gateway apparatus 10 has a generation unit 11 and a transmission unit 12. Out of these, the generation unit 11 generates allocation information on an individual channel to be individually allocated to each of the radio stations. Also, the transmission unit 12 transmits the allocation information generated by the generation unit 11.

On the other hand, the radio station 20 has a receiving unit 21 and a data transmission unit 22. Out of these, the receiving unit 21 receives the allocation information transmitted by the gateway apparatus 10. Also, if the allocation information received by the receiving unit 21 includes information indicating the own station, the data transmission unit 22 performs data transmission through an individual channel allocated to the own station. In addition, if the allocation information received by the receiving unit 21 does not include information indicating the own station, the data transmission unit 22 performs data transmission by random access through a channel other than an individual channel of a radio frame.

In this manner, in the radio communication system 1, a radio station accesses a gateway apparatus based on allocation information which divides radio stations into radio stations performing data transmission through individual channels and radio stations performing data transmission by random access through a channel other than the individual channels. As a result, in the radio communication system 1, by allocating a channel related to data transmission by a radio station, collisions at a destination of transmission data by a radio station is restrained. Accordingly, compared with a related-art technique in which data transmission is performed only by random access, it is possible to reduce the occurrence of congestion.

Second Embodiment

Figure 2:
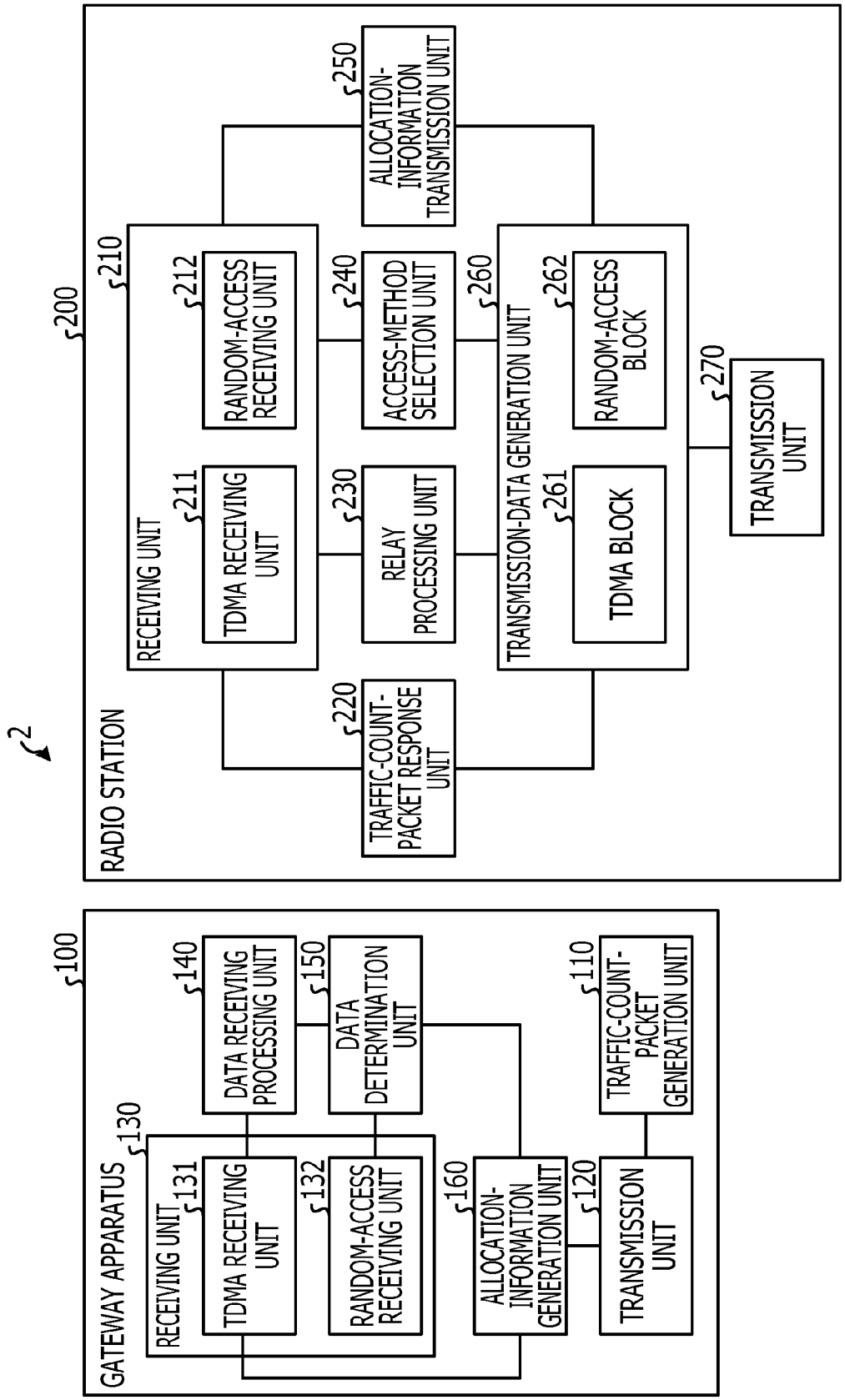
FIG. 2 illustrates an example of a configuration of a radio communication system according to a second embodiment.

A description will be given of an example of a configuration of a radio communication system according to a second embodiment using FIG. 2. FIG. 2 is a diagram illustrating an example of a configuration of a radio communication system according to the second embodiment. For example, as illustrated in FIG. 2, in a radio communication system 2, a gateway apparatus and a plurality of radio stations perform radio communication. For example, the radio communication system 2 has a gateway apparatus 100 and a radio station 200. Also, the gateway apparatus 100 is an example of the gateway apparatus 10 according to the first embodiment, and the radio station 200 is an example of the radio station 20 according to the first embodiment.

Also, each of the radio stations included in the radio communication system 2 is capable of performing radio communication by multi-step relay, in which radio communication with the gateway apparatus 100 is performed through a radio station other than the own station in the radio communication with the gateway apparatus 100. One of the reasons for each of the radio station performing multi-stage relay is, for example, that there are radio stations having a low communication quality in data communication with the gateway apparatus 100 because of factors, such as a shield, a distance from the gateway apparatus 100, etc. In such multi-step relay, each of the radio stations constructs an optimum path to the gateway apparatus 100, and transmits data to a radio station existing on the optimum path. In this regard, each of the radio stations transmits various kinds of data to the gateway apparatus 100 using a random access method by default.

In the above-described configuration, the gateway apparatus 100 has a traffic-count packet generation unit 110, a transmission unit 120, a receiving unit 130, a data-receiving processing unit 140, a data determination unit 150, and an allocation-information generation unit 160, and performs radio communication with the plurality of radio stations.

The traffic-count packet generation unit 110 generates, for example, a traffic count packet for counting the traffic between the gateway apparatus 100 and each of the radio stations, and outputs the packet to the transmission unit 120. Such a traffic count packet is generated at predetermined intervals based on a timer (not illustrated in the figure), etc. The transmission unit 120 transmits, for example, a traffic count packet output by the traffic-count packet generation unit 110 to each of the radio stations. Also, the transmission unit 120 transmits, for example, allocation information output by the allocation-information generation unit 160 to each of the radio stations. In this regard, the transmission unit 120 is an example of the transmission unit 12 according to the first embodiment.

The receiving unit 130 receives various kinds of data transmitted from each of the radio stations, and has, for example, a Time Division Multiple Access (TDMA) receiving unit 131 and a random-access receiving unit 132. Out of these, the TDMA receiving unit 131 receives, for example, data transmitted from a radio station using access by a TDMA method, and outputs the data to the data-receiving processing unit 140.

On the other hand, the random-access receiving unit 132 receives, for example, data transmitted from a radio station using access by a random access method, and outputs the data to the data determination unit 150. In this regard, data received by the random-access-receiving unit 132 includes a response packet responding to transmission of a traffic count packet in addition to normal data.

The data-receiving processing unit 140 performs, for example, receiving processing of data output from the TDMA receiving unit 131 and the data determination unit 150, etc. The data determination unit 150 determines, for example, whether data output by the random-access receiving unit 132 is usual data or a response packet responding to transmission of a traffic count packet. And the data determination unit 150 outputs the usual data to the data-receiving processing unit 140, and outputs the response packet responding to transmission of a traffic count packet to the allocation-information generation unit 160.

The allocation-information generation unit 160 determines whether the traffic between the gateway apparatus 100 and each of the radio stations is a predetermined threshold value or higher, for example, based on the response packet responding to the transmission of a traffic count packet output from the data determination unit 150. And the allocation-information generation unit 160 generates allocation information so as to allocate an individual channel to a radio station whose traffic is a predetermined threshold value or higher, and so as not to allocate an individual channel to a radio station whose traffic is lower than the predetermined threshold value. In this regard, the channel means, for example, a time slot, etc.

That is to say, a radio station to which an individual channel is allocated by the allocation-information generation unit 160 transmits various kinds of data to the gateway apparatus 100 through the individual channel by accessing using a TDMA method. On the other hand, a radio station to which an individual channel is not allocated by the allocation-information generation unit 160 transmits various kinds of data to the gateway apparatus 100 through a channel other than an individual channel by accessing using a random access method, which is used by default. Also, the allocation-information generation unit 160 outputs information related to synchronization of receiving time of the data allocated to an individual channel based on the generated allocation information, and transmitted by a TDMA method to the TDMA receiving unit 131. In this regard, the allocation-information generation unit 160 is an example of the generation unit 11 according to the first embodiment.

Here, a description will be given of allocation information generated by the allocation-information generation unit 160 using FIG. 3. FIG. 3 is a diagram illustrating an example of a format of the allocation information according to the second embodiment. In this regard, FIG. 3 is an example in the case where a channel is a time slot.

For example, as illustrated in FIG. 3, the allocation information includes related information of a TDMA-method time slot and related information of a random-access-method time slot. Specifically, the related information of the TDMA-method time slot includes a "time-slot time width", an "allocated radio-station ID", and a "transmission-destination radio station ID". Also, the related information of a random-access-method time slot includes a "random slot time width". In this regard, there are the same number of pieces of the related information of a TDMA-method time slot as the number of radio stations to which time slots are allocated.

The "time-slot time width" is, for example, "slot1 time width" and "slot2 time width" illustrated in FIG. 3. Also, the "allocated radio-station ID" is, for example, identification information identifying a radio station to which a TDMA-method time slot is allocated as a "time-slot time width". Also, the "transmission-destination radio station ID" is, for example, identification information identifying a radio station that is a transmission destination of data transmitted by the radio station to which a TDMA-method time slot is allocated as a "time-slot time width". However, if a TDMA-method time slot is allocated to a radio station directly performing data communication with the gateway apparatus 100, identification information identifying the gateway apparatus 100 is inserted into the "transmission-destination radio station ID".

Referring back to the description of FIG. 2, the radio station 200 includes a receiving unit 210, a traffic-count-packet response unit 220, a relay processing unit 230, an access-method selection unit 240, an allocation-information transmission unit 250, a transmission-data generation unit 260, and a transmission unit 270. Also, the radio station 200 performs radio communication with the gateway apparatus 100.

The receiving unit 210 receives various kinds of data transmitted from a radio station different from the gateway apparatus 100 and the radio station 200, etc., and, for example, includes a TDMA receiving unit 211 and a random-access receiving unit 212. In this regard, the receiving unit 210 is an example of the receiving unit 21 according to the first embodiment.

Out of these, the TDMA receiving unit 211 receives, for example, data transmitted from the other radio station using access by a TDMA method, and outputs the data to the relay processing unit 230. On the other hand, the random-access receiving unit 212 receives, for example, data transmitted from a radio station using access by a random access method, and outputs the data to the relay processing unit 230. Also, the random-access receiving unit 212 receives, for example, a traffic count packet transmitted from the gateway apparatus 100, and outputs the packet to the traffic-count-packet response unit 220. Also, the random-access receiving unit 212 receives, for example, allocation information transmitted from the gateway apparatus 100 or the other radio station, and outputs the information to the access-method selection unit 240. Also, the random-access receiving unit 212 receives, for example, allocation information transmitted from the gateway apparatus 100 or the other radio station, and outputs the information to the allocation-information transmission unit 250.

The traffic-count-packet response unit 220 adds, for example, a traffic state of the own station to a response signal (acknowledgement: ACK) for the traffic count packet output from the random-access receiving unit 212, and outputs the packet to the transmission-data generation unit 260. The relay processing unit 230 performs, for example, relay processing of the data output from the TDMA receiving unit 211, and outputs the data to the transmission-data generation unit 260. Also, the relay processing unit 230 performs, for example, relay processing of the data output from the random-access receiving unit 212, and outputs the data to the transmission-data generation unit 260. In this regard, the data output from the random-access receiving unit 212 includes, for example, a traffic count packet to the other radio station, a response packet responding to a traffic count packet from the other radio station, etc., in addition to usual data.

If, for example, the allocation information output from the random-access receiving unit 212 includes identification information indicating the own station, the access-method selection unit 240 determines to perform data transmission using the TDMA-method time slot allocated to the own station. Also, for example, if the allocation information does not include identification information indicating the own station, the access-method selection unit 240 determines to perform data transmission using a time slot other than the TDMA-method time slot by random access. After that, the access-method selection unit 240 notifies a time slot of the determined access method to the transmission-data generation unit 260.

The allocation-information transmission unit 250, for example, determines whether the allocation information output from the random-access receiving unit 212 includes identification information indicating a radio station that performs direct data communication with the own station out of the radio stations under the own station. And if the identification information is included, the allocation-information transmission unit 250 adds the identification information indicating the own station to the allocation information, and outputs the added allocation information to the transmission-data generation unit 260. Also, the allocation-information transmission unit 250 outputs information related to synchronization of receiving time of the data transmitted by a TDMA method to the TDMA receiving unit 211 based on the allocation information.

The transmission-data generation unit 260 generates various kinds of data to be transmitted in accordance with, for example, an access method output from the access-method selection unit 240, and has a TDMA block 261 and a random access block 262. Out of these, the TDMA block 261, for example, generates data related to the TDMA method, which has been output from the relay processing unit 230 in accordance with the TDMA method, and outputs the data to the transmission unit 270. On the other hand, the random access block 262, for example, generates data related to a random access method, which has been output from the traffic-count-packet response unit 220, the relay processing unit 230, and the allocation-information transmission unit 250, etc., in accordance with the random access method, and outputs the data to the transmission unit 270. The transmission unit 270, for example, transmits the various kinds of data output from the TDMA block 261 and the random access block 262. In this regard, the access-method selection unit 240 and the transmission unit 270 are an example of the data transmission unit 22 according to the first embodiment.

Figure 4:
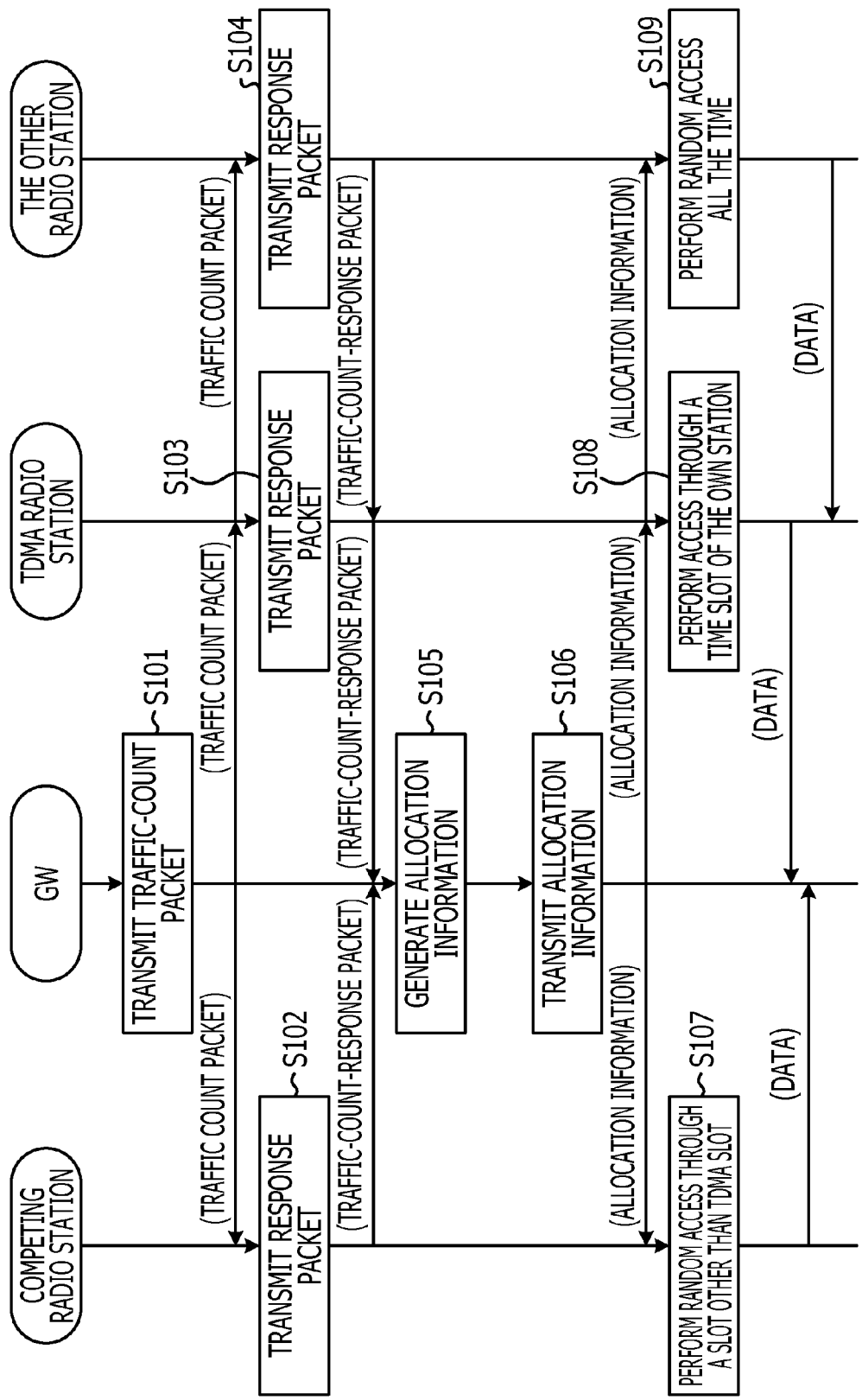
FIG. 4 is a processing sequence diagram illustrating an example of radio communication processing according to the second embodiment.

Next, a description will be given of radio communication processing according to a second embodiment using FIG. 4. FIG. 4 is a processing sequence diagram illustrating an example of radio communication processing according to the second embodiment. In this regard, the radio communication processing means processing performed by the gateway apparatus 100 and the plurality of radio stations included in the radio communication system 2. In this regard, in FIG. 4, a gateway apparatus "Gate Way (GW)", a "TDMA radio station" accessing by a TDMA method, a "competing radio station" performing random access using a time slot other than the time slot of the TDMA radio station, and "the other radio station(s)" other than these are taken as an example.

For example, as illustrated in FIG. 4, the GW generates a traffic count packet, and transmits the packet to each of the radio stations (step S101). The competing radio station that has received the traffic count packet adds a traffic state of the own station to a response signal, and transmits a response packet responding to the traffic count packet to the GW (step S102).

Also, the TDMA radio station that has received the traffic count packet adds a traffic state of the own station to a response signal, and transmits a response packet responding to the traffic count packet to the GW (step S103). At this time, the TDMA radio station relays the traffic count packet received from the GW to the other radio station(s). Also, the other radio station(s) that has (have) received the traffic count packet adds a traffic state of the own station to a response signal, and transmits a response packet responding to the traffic count packet to the GW through the TDMA radio station (step S104). At this time, the TDMA radio station relays the response packet responding to the traffic count packet received from the other radio stations to the GW. In this regard, the above-described transmission and receiving of the traffic count packet is an example, and there are cases where the traffic count packet is relayed from the TDMA radio station to another TDMA radio station, and the traffic count packet is relayed from the TDMA radio station to a competing radio station in addition to the above-described case. This is the same for transmitting and receiving the allocation information.

The GW that has received a response packet from each of the radio stations generates allocation information in accordance with the traffic of each of the radio stations (step S105). Such allocation information is generated such that a predetermined time slot is allocated to a TDMA radio station having traffic of a predetermined threshold value or higher, and the predetermined time slot is not allocated to a competing radio station having traffic lower than a predetermined threshold value and the other radio station(s). For example, the allocation information to be generated includes a predetermined time slot "slot1 time width", identification information "allocated radio station ID" indicating a TDMA radio station, identification information "transmission-destination radio station ID" indicating the GW, and "random-slot time width" other than the "slot1 time width". And the GW transmits the generated allocation information to each of the radio station (step S106).

The competing radio station that has received allocation information from the GW recognizes that the own station is a radio station competing with the TDMA radio station from the fact that the identification information indicating the TDMA radio station is included in "allocated radio station ID", and that the identification information of the radio station that has transmitted the allocation information is included in "transmission-destination radio station ID" at the same time. And the competing radio station determines to perform random access using a time slot other than the time slot of "slot1 time width" allocated to the TDMA radio station. That is to say, the competing radio station determines to perform random access using a time slot other than the time slot competing with the TDMA radio station (step S107). In short, the competing radio station recognizes that the own station is a radio station that might conflict with the communication between the TDMA radio station and the GW from the allocation information received from the GW, and thus the competing radio station performs random access using a time slot other than the time slot of the TDMA radio station in order to avoid collision with the communication.

Also, the TDMA radio station that has received allocation information from the GW determines to perform TDMA using the allocated predetermined time slot (step S108). At this time, the TDMA radio station relays the allocation information to the other radio station(s). However, if the allocation information includes identification information indicating subordinate radio stations directly performing data communication with the own station, the TDMA radio station ought to transmit the allocation information with the added identification information indicating the own station, and thus relay processing of the allocation information is sometimes not performed. Here, a description will be given on the assumption that the TDMA radio station performs the relay processing.

Also, the other radio station(s) that has(ve)_received allocation information through the TDMA radio station recognizes that the own station is a radio station not competing with the TDMA radio station because the identification information indicating the own station is not included in "allocated radio station ID", and at the same time, the allocation information has not been directly received from the GW. Otherwise the other radio station(s) does not receive allocation information from the TDMA radio station so that the other radio station(s) recognizes that the own station is a radio station not competing with the TDMA radio station. And the other radio station(s) has particularly little chance of colliding with communication between the TDMA radio station or the GW with the other radio station(s), etc., so that the other radio station(s) determines to perform random access all the time (step S109). Thereby, all the radio stations transmit data to the GW by the time slot based on the allocation information and a predetermined access method.

Figure 5:
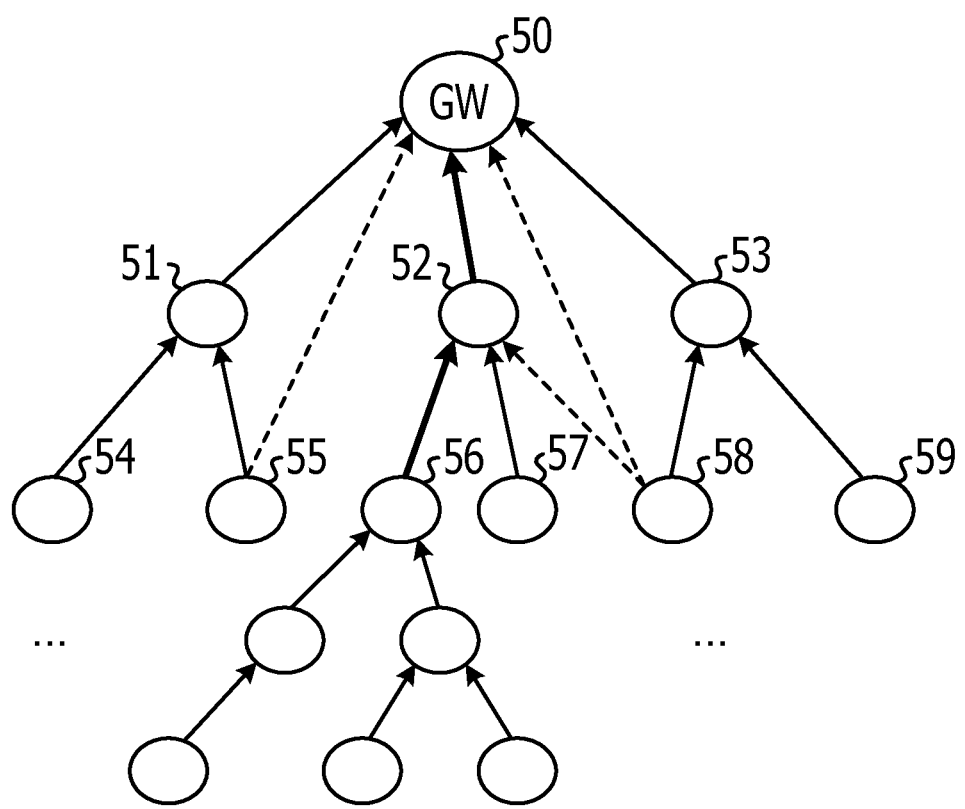
FIG. 5 illustrates an example of a configuration of a radio communication system.

Next, a description will be given of use of the identification information included in the allocation information according to the second embodiment using FIG. 5, FIG. 6A, and FIG. 6B. FIG. 5 is a diagram illustrating an example of a configuration of a radio communication system. Also, FIG. 6A is a diagram illustrating an example of a format when the allocation information is transmitted by the GW according to the second embodiment. FIG. 6B is a diagram illustrating an example of a format when the allocation information is relayed by a radio station according to the second embodiment.

For example, as illustrated in FIG. 5, the radio communication system includes a GW 50, radio stations 51 to 59, and a plurality of radio stations (reference numerals are not added) located under the radio station 56. Among these, the GW 50 is an example of the gateway apparatus 100, the radio station 51 to 59, and the plurality of radio stations located under the radio station 56 are examples of the radio station 200. In this regard, in FIG. 5, it is assumed that traffic of each of the radio stations is substantially the same.

Also, in FIG. 5, the number of radio stations located under the radio station 52 and the radio station 56 is larger than the number of the other radio stations, and thus traffic of the radio station 52 and the radio station 56 is higher than that of the other radio stations. Accordingly, a description will be given of the case where the radio station 52 and the radio station 56 are assumed to be TDMA radio stations. Also, a description will be given of the case where allocation information transmitted by the GW 50 to each of the radio stations is received by the radio station 51, the radio station 52, the radio station 53, the radio station 55, and the radio station 58. Also, the radio station 57 receives the allocation information relayed by the radio station 52. That is to say, the radio station located under the radio station 56, the radio station 59, and the radio station 54 become the radio stations performing random access all the time.

Also, in FIG. 5, a solid-line arrow denotes a communication link, and a communication link using a predetermined time slot by the TDMA radio station is denoted by a bold solid line. In the same manner, in FIG. 5, a dotted-line arrow denotes an interference link, and indicates that collisions might occur in access by a radio station to be a competing radio station with access by the other radio stations.

Under the above-described circumstances, as illustrated in FIG. 6A, the GW 50 transmits allocation information allocating a time slot to the radio station 52 with "slot1 time width", and allocating a time slot to the radio station 56 with "slot 2 time width". At this time, the allocation information transmitted by the GW 50 is received by the radio station 51, the radio station 52, the radio station 53, the radio station 55, and the radio station 58. The radio station 51, the radio station 53, the radio station 55, and the radio station 58 that have received the allocation information from the GW 50 recognize that the own station is a competing radio station with the radio station 52, and determine to perform random access to the GW 50 using a time slot other than the time slot "slot1 time width".

The radio station 52 that has received the allocation information from the GW 50 detects that the allocation information includes identification information "56" indicating the radio station 56 performing direct data communication with the own station among the radio stations under the own station. And as illustrated in FIG. 6B, the radio station 52 broadcasts the allocation information with the added identification information "52" indicating the own station. At this time, the allocation information broadcast by the radio station 52 is received by the radio station 56, the radio station 57, and the radio station 58. In this regard, the radio station 52 determines to perform TDMA using the specified time slot "slot1 time width" to the GW 50 in accordance with the allocation information.

The radio station 56 that has received the allocation information from the radio station 52 determines to perform TDMA to the GW 50 using the specified time slot "slot2 time width" through the radio station 52 in accordance with the allocation information. Also, the radio station 57 and the radio station 58 that have received the allocation information from the radio station 52 recognize that the own station is a competing radio station with the radio station 56, and determine to perform random access to the GW 50 using a time slot other than the time slot of "slot2 time width".

In short, the radio station 51, the radio station 53, and the radio station 55 recognize that the own station is a competing radio station of the radio station 52 from the received allocation information, and determine to perform random access to the GW 50 using a time slot other than "slot1 time width". Also, the radio station 57 recognizes that the own station is a competing radio station with the radio station 56 from the received allocation information, and determines to perform random access to the GW 50 using a time slot other than "slot2 time width". Also, the radio station 58 recognizes that the own station is a competing radio station with the radio station 52 and the radio station 56 from the received allocation information, and determines to perform random access to the GW 50 using a time slot other than "slot1 time width" and "slot2 time width". In this regard, each of the radio stations located under the radio station 56, the radio station 59, and the radio station 54 perform random access all the time.

Figure 7:
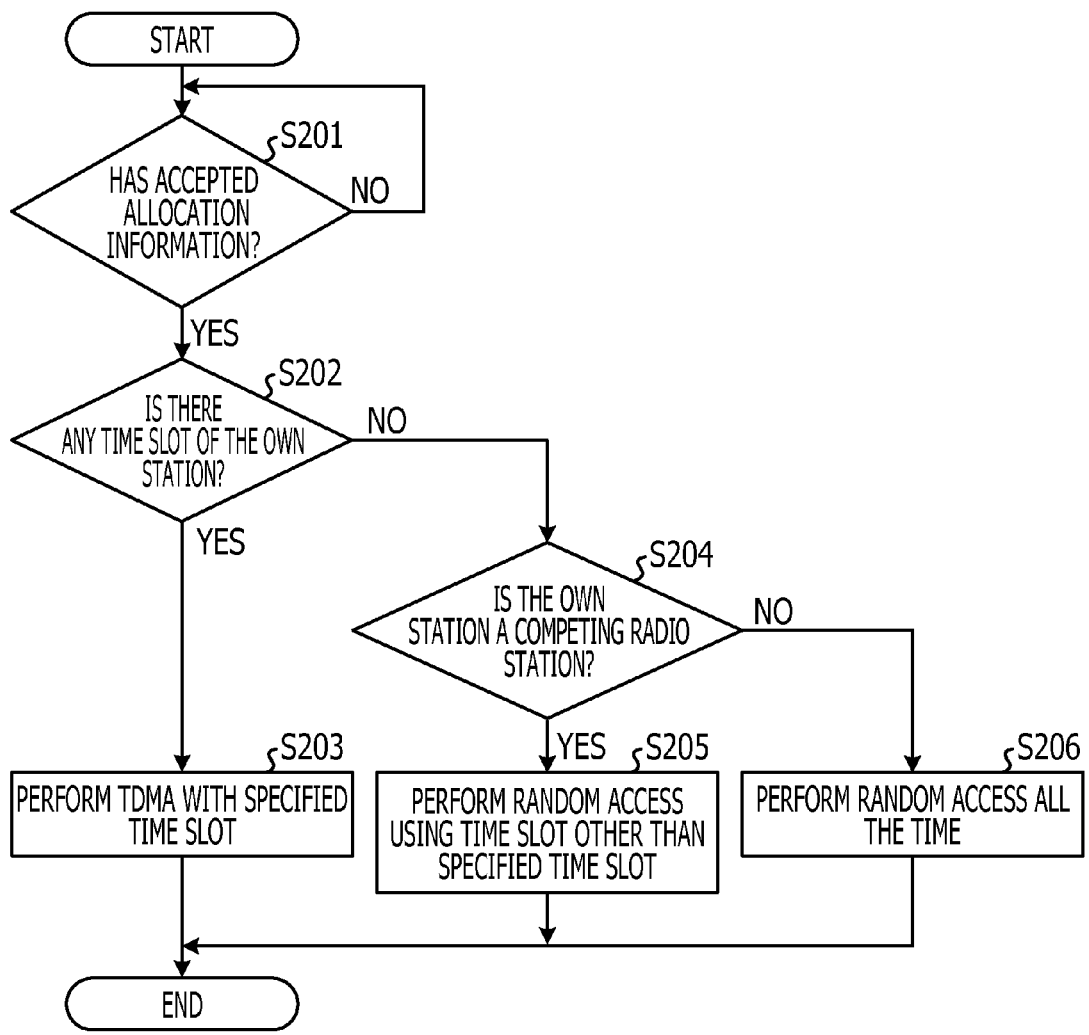
FIG. 7 is a flowchart illustrating access-method selection processing according to the second embodiment.

Next, a description will be given of access-method selection processing according to the second embodiment using FIG. 7. FIG. 7 is a flowchart illustrating access-method selection processing according to the second embodiment. In this regard, the access-method selection processing means processing performed mainly by the access-method selection unit 240.

For example, as illustrated in FIG. 7, if the radio station 200 receives allocation information (step S201 affirmative), the radio station 200 determines whether the time slot corresponding to the identification information indicating the own station is specified in the allocation information (step S202). In this regard, if the radio station 200 does not receive allocation information (step S201 negative), the radio station 200 goes into a state of waiting for receiving the allocation information.

And if the time slot of the own station is specified in the allocation information (step S202 affirmative), the radio station 200 determines to perform TDMA by the specified time slot (step S203). On the other hand, if the time slot of the own station is not specified in the allocation information (step S202 negative), the radio station 200 determines whether the own station is a competing radio station or not (step S204).

And if the radio station 200 determines that the own station is a competing radio station (step S204 affirmative), the radio station 200 determines to perform random access by a time slot other than the specified time slot (step S205). On the other hand, if the radio station 200 determines that the own station is not a competing (step S204 negative), the radio station 200 determines to perform random access all the time (step S206).

Broadcast Processing According to the Second Embodiment

Figure 8:
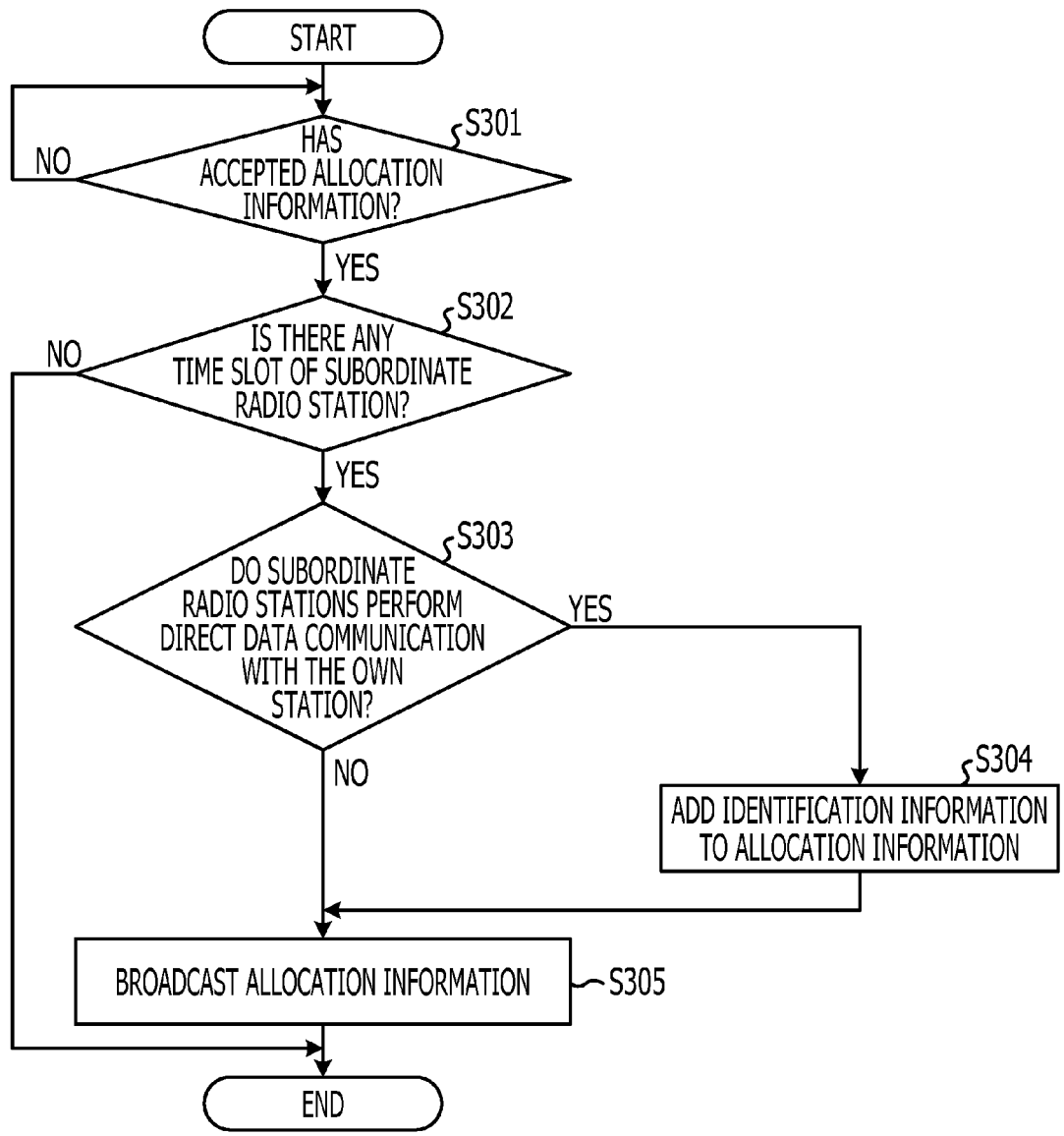
FIG. 8 is a flowchart illustrating broadcast processing according to the second embodiment.

Next, a description will be given of broadcast processing according to the second embodiment using FIG. 8. FIG. 8 is a flowchart illustrating broadcast processing according to the second embodiment. In this regard, the broadcast processing means processing mainly performed by the allocation-information transmission unit 250.

For example, as illustrated in FIG. 8, if the radio station 200 receives allocation information (step S301 affirmative), the radio station 200 determines whether the time slot corresponding to the identification information indicating a radio station located at a subordinate position is specified in the allocation information (step S302). In this regard, if the radio station 200 does not receive the allocation information (step S301 negative), the radio station 200 goes into a state of receiving the allocation information.

And if the time slot corresponding to the identification information indicating a radio station located at a subordinate position is specified in the allocation information (step S302 affirmative), the radio station 200 determines whether the subordinate radio station is a radio station performing direct data communication with the own station (step S303). Next, if the subordinate radio station is a radio station performing direct data communication with the own station (step S303 affirmative), the radio station 200 adds the identification information indicating the own station to the allocation information (step S304). In this regard, if the subordinate radio station is not a radio station directly performing data communication with the own station (step S303 negative), the radio station 200 broadcasts the allocation information without change (step S305).

Also, the radio station 200 that has added the identification information indicating the own station in the allocation information, the radio station 200 broadcast the allocation information with the identification information added (step S305). In this regard, if the time slot corresponding to the identification information indicating a radio station located at a subordinate position is not specified in the allocation information (step S302 negative), the radio station 200 terminates the processing without broadcasting the allocation information.

As described above, in the radio communication system 2, a radio station having traffic of a predetermined threshold value or higher is caused to perform access by specifying a time slot, and the other radio stations are caused to perform access using a time slot other than the specified time slot. As a result, in the radio communication system 2, when a radio station has a large number of radio stations located at subordinate positions, and has more increasing traffic than the other radio stations, collisions of accesses by that radio station are avoided. Accordingly, it is possible to restrain the occurrence of congestion.

Third Embodiment

Incidentally, in the above-described second embodiment, a description has been given of the case where a competing radio station is identified based on "allocated radio station ID" and "transmission-destination radio station ID" included in the allocation information. However, it is possible to use an "ID list of allocated radio stations having the own station as a transmission destination". Thus, in a third embodiment, a description will be given of the case of using the "ID list of allocated radio stations having the own station as a transmission destination".

Format of Frame Information According to Third Embodiment

A description will be given of a format of allocation information according to the third embodiment using FIG. 9. FIG. 9 is a diagram illustrating an example of a format of allocation information according to the third embodiment. In this regard, in FIG. 9, a description will be given of the case where a channel is a time slot in the same manner as in FIG. 3.

For example, as illustrated in FIG. 9, the allocation information includes related information of TDMA-method time slots, related information of a random-access method time slot, and related information of identification information. Specifically, the related information of TDMA-method time slots includes a "time-slot time width" and an "allocated radio station ID". Also, the related information of a random-access method time slot includes a "random-slot time width". Also, the related information of identification information includes an "ID list of allocated radio stations having the own station as a transmission destination". In this regard, there are the same number of pieces of related information of the TDMA-method time slots as the number of radio stations to which a time slot is allocated.

The "time-slot time width" means, for example, the "slot1 time width" and the "slot2 time width" illustrated in FIG. 9. Also, the "allocated radio station ID" means, for example, identification information identifying a radio station to which a TDMA-method time slot has been allocated as a "time-slot time width". Also, the "ID list of allocated radio stations having the own station as a transmission destination" means, for example, identification information of a TDMA radio station having the GW and the TDMA radio station as transmission destinations when seen from a GW and a TDMA radio station which transmit or relay the allocation information.

Next, a description will be given of use of identification information included in the allocation information according to the third embodiment using FIG. 10A and FIG. 10B. FIG. 10A is a diagram illustrating an example of a format in the case where the GW according to the third embodiment has transmitted allocation information. FIG. 10B is a diagram illustrating an example of a format in the case where a radio station according to the third embodiment has relayed allocation information. In this regard, in the following, a description will be given by taking the radio communication system illustrated in FIG. 5 as an example.

For example, as illustrated in FIG. 10A, the GW 50 transmits allocation information in which a time slot of "slot1 time width" is allocated to the radio station 52, and a time slot of "slot2 time width" is allocated to the radio station 56. Also, such allocation information includes the identification information "52" indicating the radio station 52, which is a TDMA radio station having the GW 50 as a transmission destination in the "ID list of allocated radio stations having the own station as a transmission destination". At this time, the allocation information transmitted by the GW 50 is received by the radio station 51, the radio station 52, the radio station 53, the radio station 55, and the radio station 58.

The radio station 51, the radio station 53, the radio station 55, and the radio station 58 that have received the allocation information from the GW 50 recognize that the own station is a competing radio station of the radio station 52 from the identification information "52" in "ID list of allocated radio stations having the own station as a transmission destination" included in the allocation information. That is to say, the radio station 51, the radio station 53, the radio station 55, and the radio station 58 determine to perform random access to the GW 50 using a time slot other than the time slot of "slot1 time width".

The radio station 52 that has received the allocation information from the GW 50 detects that the identification information "52" indicating the own station is included in the "ID list of allocated radio stations having the own station as a transmission destination" of the allocation information, and the identification information "56" indicating the radio station 56 is included in the allocation information. And, as illustrated in FIG. 10B, the radio station 52 adds the identification information "56" indicating the radio station 56 performing direct data communication with the own station among the radio stations under the own station to the "ID list of allocated radio stations having the own station as a transmission destination". Next, the radio station 52 broadcasts the allocation information in which identification information "56" is added to the "ID list of allocated radio stations having the own station as a transmission destination". At this time, the allocation information broadcast by the radio station 52 is received by the radio station 56, the radio station 57, and the radio station 58. In this regard, the radio station 52 determines to perform TDMA to the GW 50 using the specified time slot "slot1 time width" in accordance with the allocation information.

The radio station 56 that has received the allocation information from the radio station 52 determines to perform TDMA to the GW 50 through the radio station 52 using the specified time slot "slot2 time width" in accordance with the allocation information. Also, the radio station 57 and the radio station 58 that have received the allocation information from the radio station 52 recognize that the own station is a competing radio station of the radio station 56 from the identification information "56" as the "ID list of allocated radio stations having the own station as a transmission destination" included in the allocation information.

In short, the radio station 51, the radio station 53, and the radio station 55 recognize that the own station is a competing radio station of the radio station 52 from the received allocation information, and determine to perform random access to the GW 50 by a time slot other than the "slot1 time width". Also, the radio station 57 recognizes that the own station is a competing radio station of the radio station 56 from the received allocation information, and determine to perform random access to the GW 50 using a time slot other than the "slot2 time width". Also, the radio station 58 recognizes that the own station is a competing radio station of the radio station 52 and the radio station 56 from the received allocation information, and determines to perform random access to the GW 50 using a time slot other than the "slot1 time width" and the "slot2 time width". In this regard, each of the radio stations located under the radio station 56, the radio station 59, and the radio station 54 perform random access all the time.

As described above, in the radio communication system 2, an ID list of allocated radio stations having the own station as a transmission destination is held in the allocation information so that a competing radio station is identified, and thus it is possible to restrain congestion that occurs from data concentration.

Fourth Embodiment

Now, descriptions have been given of the embodiments of the terminal apparatus disclosed in the application concerned so far. However, various kinds of different modes other than the above-described embodiments may be implemented. Thus, descriptions will be given of different embodiment in (1) Channel, (2) Radio station communicating through an individual channel, and (3) Configuration of each apparatus.

(1) Channel

In the above-described embodiments, descriptions have been given of an example of a radio station performing access by a TDMA method in which an individual channel is time-division multiplexed. However, a radio station performing access by an Frequency Division Multiplexing Access (FDMA) method as frequency-division multiplexing may be employed. For example, a radio station to which an individual channel is allocated performs FDMA using the allocated frequencies "f (frequency) 1 to f3", and the other radio stations perform random access using frequencies "f4 to f6" other than these frequencies. Thereby, in a radio communication system, accesses by radio stations are allocated to different frequencies, and thus it is possible to restrain the occurrence of congestion.

(2) Radio Station Communicating Through Individual Channel

Also, in the above-described embodiments, descriptions have been given of the case where a radio station having traffic of a predetermined threshold value or higher is allowed to communicate through an individual channel. However, it is possible to determine a radio station communicating through an individual channel by a degree of collisions. Specifically, when the GW receives data transmitted from a radio station, the GW transmits ACK indicating the reception of the data to the radio station. However, ACK will not be transmitted unless the GW normally receives data.

Thus, the radio station detects the number of pieces of all the data transmitted to the GW, and the number of pieces of data normally transmitted to the GW by reception of ACK. That is to say, the radio station obtains a ratio of the number of pieces of data normally transmitted to the number of pieces of all the data transmitted to the GW, and transmits the ratio as a degree of collisions to the GW. In this regard, the timing of the radio station transmitting the degree of collisions to the GW ought to be included, for example, in a response packet responding to the above-described traffic count packet. Also, the GW that has received a degree of collisions from the radio station determines that the radio station having a degree of collisions of a predetermined threshold value or higher should communicate through an individual channel.

Also, in the above-described embodiments, descriptions have been given of the case where a radio station to be allowed to communicate through an individual channel is determined based on traffic. However, it is possible to allocate an individual channel to a radio station performing direct data communication with the GW, and not to allocate the individual channel to the other radio stations. As a result, in the radio communication system, it is possible to restrain congestion that occurs particularly in the vicinity of the GW.

(3) Configuration of Each Apparatus

Also, it is possible to freely change information including the processing procedures, the control procedures, specific names, various kinds of data and parameters, etc., described in the above-described embodiments and figures, etc., (for example, the specific name of "allocation-information transmission unit 250", etc.) unless otherwise specially mentioned. For example, the allocation-information transmission unit 250 may be called a "broadcast unit".

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to illustrating of the superiority and inferiority of the invention. Although the embodiment(s) of the present invention(s) has(have) been described in detail, it should be understood that various changes, substitutions, and alterations could be made hereto without departing from the spirit and scope of the invention.

The invention claimed is:

1. A radio communication system performing radio communication, comprising:
   a gateway apparatus configured to
      generate allocation information on one or more individual channels in a radio frame, each of the one or more individual channels being allocated individually to one of a plurality of radio stations; and
      transmit the generated allocation information, and
   the plurality of radio stations each of which configured to
      receive the allocation information; and
      determine, when information indicating an own station is not included in the received allocation information, whether the own station competes with a radio station among one or more radio stations to which the one or more individual channels are allocated based on the received allocation information, perform, when the own station is determined not to compete with the radio station, data transmission by random access through any channel in the radio frame, and perform, when the own station is determined to compete with the radio station, data transmission by random access through a channel other than an individual channel allocated to the radio station in the radio frame.

2. The radio communication system according to claim 1, wherein the gateway apparatus generates the allocation information so as to allocate each of the one or more individual channels to a radio station having traffic of a predetermined threshold value or higher, and not to allocate each of the one or more individual channels to a radio station having traffic lower than the predetermined threshold value.

3. The radio communication system according to claim 1, wherein each of the plurality of radio stations is further configured to transmit the allocation information with added information indicating the own station when the received allocation information includes information indicating a radio station directly performing data communication with the own station among one or more radio stations under the own station in a network structural hierarchy.

4. The radio communication system according to claim 1, wherein each of the plurality of radio stations is further configured to transmit the allocation information with information indicating a radio station directly performing data communication with the own station added at a predetermined position among one or more radio stations under the own station in a network structural hierarchy when information indicating the own station is included at the predetermined position of the received allocation information, and information indicating a radio station directly performing data communication with the own station among the one or more radio stations under the own station is included in the allocation information.

5. The radio communication system according to claim 1, wherein the gateway apparatus is further configured to generate the allocation information so as to allocate each of the one or more individual channels to a radio station directly performing data communication with the gateway apparatus, and not to allocate each of the one or more individual channels to a radio station performing data communication with the gateway apparatus through another radio station.

6. The radio communication system according to the claim 1, wherein
each of the plurality of radio stations is configured to perform, when the information indicating the own station is included in the received allocation information, data transmission through an individual channel allocated to the own station among the one or more individual channels.

7. The radio communication system according to the claim 1, wherein
the gateway apparatus is configured to initiate a traffic count process to determine a traffic value for each of the plurality of radio stations, each of the one or more individual channels being allocated based on the determined traffic value corresponding to the one of the plurality of radio stations.

8. A method of radio communication in a radio communication system including a gateway apparatus and a plurality of radio stations performing radio communication, the method comprising:
generating, by the gateway apparatus, allocation information on one or more individual channels in a radio frame, each of the one or more individual channels being allocated individually to one of the plurality radio stations;
transmitting the generated allocation information from the gateway apparatus;
receiving the allocation information by each of the plurality of radio stations;
each of the plurality of radio stations determining, when information indicating an own station is not included in the received allocation information, whether the own station competes with a radio station among one or more radio stations to which the one or more individual channels are allocated based on the received allocation information;
each of the plurality of radio stations performing, when the own station is determined not to compete with the radio station, data transmission by random access through any channel in the radio frame; and
each of the plurality of radio stations performing, when own station is determined to compete with the radio station, data transmission by random access through a channel other than an individual channel allocated to the radio station in the radio frame.

9. The method according to the claim 8, further comprising:
each of the plurality of radio stations performing, when the information indicating the own station is included in the received allocation information, data transmission through an individual channel allocated to the own station among the one or more individual channels.

10. The method according to the claim 8, further comprising:
initiating, by the gateway apparatus, a traffic count process to determine a traffic value for each of the plurality of radio stations, each of the one or more individual channels being allocated based on the determined traffic value corresponding to the one of the plurality of radio stations.

11. A gateway apparatus comprising:
a receiver configured to receive radio communication from a plurality of radio stations;
a processor configured to
generate allocation information on one or more individual channels in a radio frame each of the one or more individual channels being allocated individually to one of the plurality of radio stations; and
a transmitter configured to transmit the generated allocation information, each of the plurality of radio stations receiving the allocation information each of the plurality of radio stations, performing, when information indicating an own station is not included in the received allocation information and when the own station is determined not to compete with a radio station among one or more radio stations to which the one or more individual channels are allocated, data transmission by random access through any channel in the radio frame, and performing, when the information indicating the own station is not included in the received allocation information and when the own station is determined to compete with the radio station, data transmission by random access through a channel other than an individual channel allocated to the radio station in the radio frame.

12. The gateway apparatus according to the claim 11, wherein
the gateway apparatus is configured to initiate a traffic count process to determine a traffic value for each of the plurality of radio stations, each of the one or more individual channels being allocated based on the determined traffic value corresponding to the one of the plurality of radio stations.

13. A radio station performing radio communication with a gateway apparatus, the radio station comprising:
a receiver configured to receive allocation information on one or more individual channels in a radio frame, each of the one or more individual channels being allocated individually to one of a plurality of radio stations by the gateway apparatus; and
a transmitter configured to:
perform, when information indicating an own station is not included in the received allocation information and when the own station is determined not to compete with another radio station among one or more radio stations to which the one or more individual channels are allocated, data transmission by random access through any channel in the radio frame, and
perform, when the information indicating the own station is not included in the received allocation information and when the own station is determined to compete with the another radio station, data transmission by random access through a channel other than an individual channel allocated to the radio station in the radio frame.

14. The radio station according to the claim 13, wherein
the receiver is configured to receive a traffic count packet from a traffic count process initiated by the gateway apparatus to determine a traffic value for each of the plurality of radio stations, each of the one or more individual channels being allocated based on the determined traffic value corresponding to the one of the plurality of radio stations; and
the transmitter is configured to transmit a response to the traffic count packet.

15. The radio station according to the claim 13, wherein
the transmitter is configured to perform, when the information indicating the own station is included in the received allocation information, data transmission through an individual channel allocated to the own station among the one or more individual channels.

* * * * *